US009574646B1

(12) United States Patent
Edsinger et al.

(10) Patent No.: US 9,574,646 B1
(45) Date of Patent: Feb. 21, 2017

(54) TWISTED STRING TRANSMISSION

(71) Applicant: Redwood Robotics Inc., San Francisco, CA (US)

(72) Inventors: Aaron Edsinger, San Francisco, CA (US); Jeff Weber, San Francisco, CA (US); Philip Mullins, San Francisco, CA (US); Lee Magnusson, San Francisco, CA (US)

(73) Assignee: Redwood Robotics Inc., San Francisco, CA (US)

( * ) Notice: Subject to any disclaimer, the term of this patent is extended or adjusted under 35 U.S.C. 154(b) by 615 days.

(21) Appl. No.: 14/061,668

(22) Filed: Oct. 23, 2013

Related U.S. Application Data

(60) Provisional application No. 61/718,645, filed on Oct. 25, 2012, provisional application No. 61/718,648, filed on Oct. 25, 2012, provisional application No. 61/718,650, filed on Oct. 25, 2012, provisional application No. 61/718,653, filed on Oct. 25, 2012, provisional application No. 61/718,654, filed on Oct. 25, 2012, provisional application No. 61/718,655, filed on Oct. 25, 2012.

(51) Int. Cl.
*G05B 13/00* (2006.01)
*F16H 21/16* (2006.01)

(52) U.S. Cl.
CPC .................................... *F16H 21/16* (2013.01)

(58) Field of Classification Search
CPC ...... F16H 21/16; F16H 19/19; F16H 19/0654; Y10S 901/39; Y10S 294/907; B25J 9/104; B25J 15/08; B25J 25/0009; G05B 19/19

USPC ......................................................... 700/275
See application file for complete search history.

(56) References Cited

U.S. PATENT DOCUMENTS

| | | | |
|---|---|---|---|
| 7,534,226 B2 * | 5/2009 | Mernoe | A61M 5/14244 222/333 |
| 8,483,880 B2 | 7/2013 | De La Rosa Tames et al. | |
| 2007/0073228 A1 * | 3/2007 | Mernoe | A61M 5/14244 604/131 |
| 2007/0185449 A1 * | 8/2007 | Mernoe | A61M 5/14244 604/131 |

(Continued)

FOREIGN PATENT DOCUMENTS

WO        2006105794 A1        10/2006

OTHER PUBLICATIONS

Sonoda et al. Multi-Fingered Robotic Hand Employing Strings Transmission Named "Twist Drive". The 2010 IEE/RSJ International Conference on Intelligent Robots and Systems. Oct. 18-22, 2014. Taipei, Taiwan.

(Continued)

*Primary Examiner* — Robert Fennema
*Assistant Examiner* — Sivalingam Sivanesan
(74) *Attorney, Agent, or Firm* — McDonnell Boehnen Hulbert & Berghoff LLP

(57) ABSTRACT

A twisted string transmission system comprises a twisted string actuator, a force sensor, and a controller. The twisted string actuator is for converting a rotational motion into a linear force. The force sensor is for sensing the linear force. The controller is for receiving sensor information regarding the linear force from the force sensor and for providing control information to control the rotational motion based at least in part on the sensor information.

19 Claims, 22 Drawing Sheets

(56) References Cited

U.S. PATENT DOCUMENTS

| | | | | |
|---|---|---|---|---|
| 2008/0066574 A1* | 3/2008 | Murata | ..................... | A61F 2/68 74/826 |
| 2011/0040408 A1* | 2/2011 | De La Rosa Tames | .................... | B25J 9/1045 700/258 |
| 2012/0330530 A1* | 12/2012 | Montvay | ............... | F02D 41/221 701/102 |
| 2014/0035306 A1* | 2/2014 | Garcia | ................. | B25J 15/0009 294/213 |

OTHER PUBLICATIONS

Wurtz et al. The Twisted String Actuation System: Modeling and Control. 2010 IEEE/ASME International Conference on Advanced Intelligent Mechatronics. Montreal, Canada. Jul. 6-9, 2010.

* cited by examiner

TWISTED STRING TRANSMISSION

This application claims priority to U.S. Provisional Patent Application No. 61/718,645 entitled SENSING THE OUTPUT FORCE OF A TWISTED STRING TRANSMISSION filed Oct. 25, 2012 which is incorporated herein by reference for all purposes.

This application claims priority to U.S. Provisional Patent Application No. 61/718,648 entitled TWISTED STRING TRANSMISSION WITH INCREASED LIFESPAN AND THROW filed Oct. 25, 2012 which is incorporated herein by reference for all purposes.

This application claims priority to U.S. Provisional Patent Application No. 61/718,650 entitled STRING ATTACHMENT FOR A TWISTED STRING TRANSMISSION filed Oct. 25, 2012 which is incorporated herein by reference for all purposes.

This application claims priority to U.S. Provisional Patent Application No. 61/718,653 entitled COMPACT TWISTED STRING ACTUATOR filed Oct. 25, 2012 which is incorporated herein by reference for all purposes.

This application claims priority to U.S. Provisional Patent Application No. 61/718,654 entitled PRELOAD OF AN ANTAGONISTIC TWISTED STRING TRANSMISSION filed Oct. 25, 2012 which is incorporated herein by reference for all purposes.

This application claims priority to U.S. Provisional Patent Application No. 61/718,655 entitled ROBOT JOINT UTILIZING TWISTED STRING ACTUATORS filed Oct. 25, 2012 which is incorporated herein by reference for all purposes.

BACKGROUND OF THE INVENTION

In robotics, electric motor actuators typically require a mechanical transmission, as motors are most efficient at high speeds and low forces, while applications typically require low speeds and high forces. Traditionally, gear transmissions are employed. However, these suffer from low efficiency, high cost, high weight, and a low tolerance to impact loads.

BRIEF DESCRIPTION OF THE DRAWINGS

Various embodiments of the invention are disclosed in the following detailed description and the accompanying drawings.

DETAILED DESCRIPTION

Figure 1:
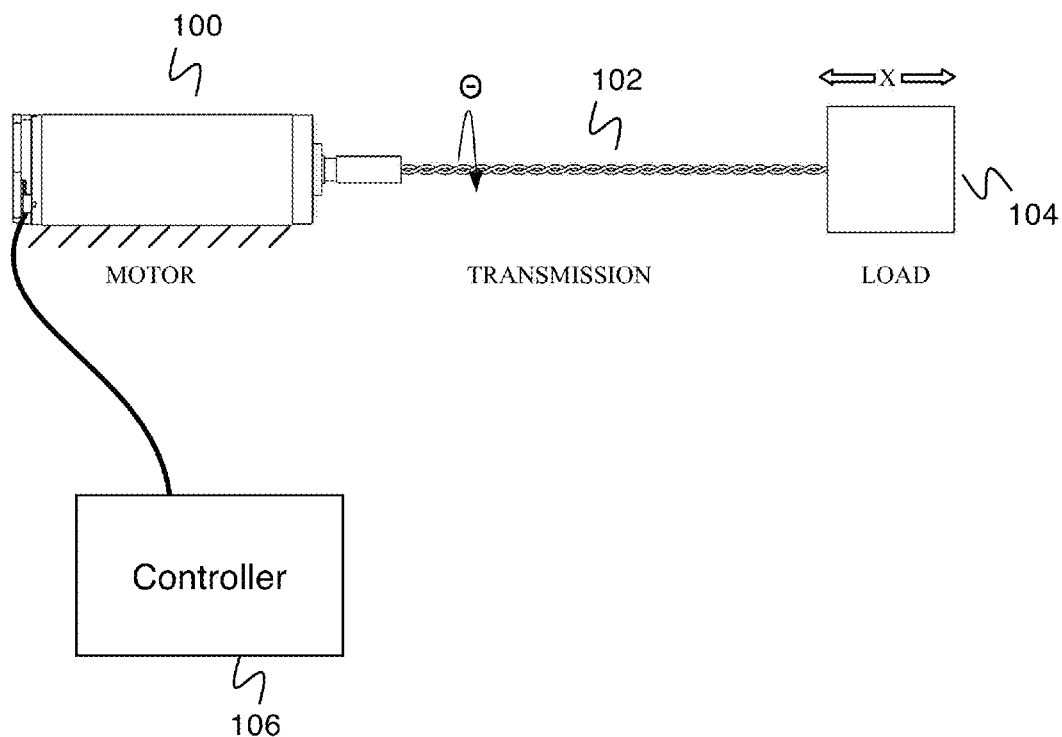
FIG. 1 is a diagram illustrating an embodiment of a twisted string actuator system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A twisted string transmission system is disclosed. The twisted string transmission comprises a twisted string actuator, a force sensor, and a controller. The twisted string actuator is for converting a rotational motion into a linear force. The force sensor is for sensing the linear force. The controller is for receiving sensor information regarding the linear force from the force sensor and providing control information to control the rotational motion based at least in part on the sensor information.

In some embodiments, a twisted string actuator is a low-cost, lightweight, and compact actuator comprised of an electric motor, controller, and a mechanical transmission. The twisted string transmission system converts rotary motion of a motor into linear motion. The twisted string transmission system includes the ability to sense and control an output force in a system utilizing a twisted string transmission. In robotics, electric motor actuators typically require a mechanical transmission, as motors are most efficient at high speeds and low forces, while applications typically require low speeds and high forces. Traditionally, gear transmissions are employed. However, these suffer from low efficiency, high cost, high weight, and a low tolerance to impact loads. An alternative to a gear transmission is a twisted string transmission comprising strings.

In some embodiments, in robotics, along with other applications, it is useful to measure or estimate the magnitude of the output force of a transmission. In some embodiments, a transmission system in which the output force is known is used as part of an active control loop, or senses changes in the output load. In some embodiments, the system is used to actively track a desired transmission force trajectory or transmission impedance. The twisted string transmission system includes the capability of estimating or measuring the output force. In some embodiments, there is a non-linear input-output sensor relationship, but the relationship is monotonic and can be made linear through a calibration method, which is represented by a function. Performance of a twisted string transmission is enhanced by adding the ability to directly measure the output force of the transmission. In some embodiments, force feedback methods that do not directly measure the output force of the transmission estimates the force based on the known output torque of the motor. However, the twisted string transmission has complex friction and hysteresis effects that are difficult to model effectively. Direct measurement of the output force allows these effects to be ignored.

In some embodiments, in robotic, prosthetic and other similar applications, efficient use of space is crucial. A compact twisted string transmission is disclosed, wherein the compact twisted string transmission increases the actuation travel without increasing the overall length of the string transmission and without reducing the transmission lifespan. In the standard twisted string transmission, the effective length of the string that can be wound is equal to the overall length of the transmission. This length contracts as the transmission winds and expands as the transmission unwinds. A compact twisted string transmission increases a twisted string actuator's throw without increasing the overall transmission length or decreasing the lifespan.

In some embodiments, twisting the strings of a twisted string transmission at the motor end requires holding the strings at a radius, R, around a center point. The ends are rotated around the center point to twist the string, causing the transmission to contract or expand. A common failure point of a twisted string transmission is the attachment point of the string to the input end (either a hub or gear driven by the motor, or the motor itself) or to the output end of the string transmission. At these attachment points, the winding and unwinding of the string causes stress concentrations where the string contacts the attachment feature. As the transmission winds and unwinds, the angle at which the string enters the attachment feature changes, causing abrasion of the string. An increase in localized stress in the string along with degrading strength due to abrasion can lead to failure of the transmission.

FIG. 1 is a diagram illustrating an embodiment of a twisted string actuator system. In the example shown, the twisted string actuator system comprises motor 100 and twisted string transmission 102. The twisted string actuator system additionally comprises controller 106 for controlling motor 100. Twisted string transmission 102 comprises two strings. In various embodiments, twisted string transmission 102 comprises one string, two strings, three strings, six strings, eleven strings, or any other appropriate number of strings. One end of transmission 102 is attached to the spinning shaft of motor 100, while the second end is attached to load 104. As the shaft of motor 100 turns in a first direction, twisted string transmission 102 twists, causing it to contract. As the shaft of motor turns 100 in the opposite direction, twisted string transmission 102 untwists and expands. Load 104 is assumed to be a constant force, pulling away from the motor 100 along the axis of rotation. The overall length of the string transmission shortens or lengthens correspondingly, moving the load by a displacement X. The change in the overall string transmission length is called the throw.

In some embodiments, a model is created that predicts the output force based on the sensed motor position and sensed load position. In some embodiments, the model is based on measured parameters and modeled characteristics of the system derived through testing and empirical data. In some embodiments, controller 106 uses a model of the relationship between output force and load displacement for controlling motor 100.

In some embodiments, one characteristic of the transmission is that it can only be wound up to a certain extent. This is due to the fact that the string becomes so tightly bunched up that the thickness of the string restricts it from being able to wind any further without over-winding. When the string is unwound, there is space for the string to wind up—the twists of the string are not densely packed. As the transmission winds up the twists become denser, both because the inherent nature of the twisted string transmission is that it must wind more tightly to effect movement of a load, and because the overall length of the transmission contracts.

Figure 2:
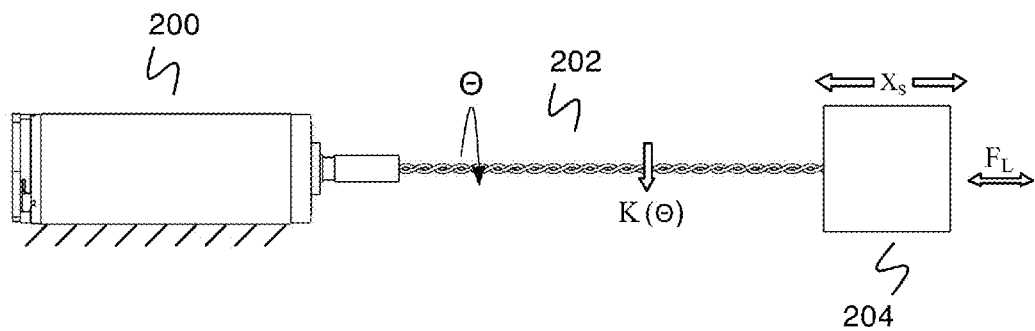
FIG. 2 is a diagram illustrating an embodiment of a twisted string actuator system.

FIG. 2 is a diagram illustrating an embodiment of a twisted string actuator system. In the example shown, the twisted string actuator system comprises motor 200 and twisted string transmission 202. When twisted string transmission 202 changes its length, load 204 moves. The linear distance load 204 has moved comprises a distance $X_s$, which can be measured with a sensor (e.g., an encoder). $X_m(\Theta)$ comprises a model describing the output position of the transmission given the current motor position, $\Theta$. In some embodiments, transmission 202 acts as a non-linear spring with a stiffness that varies with motor position. The spring stiffness, $K(\Theta)$, can be measured empirically or derived analytically. The spring is non-ideal due to friction effects between the string fibers. An estimate of the spring damping and hysteresis, $H(\Theta, X_m, X_s)$, which can be modeled or based on empirical data, may be included in the stiffness model function K to improve the system accuracy. The following equation can then be derived to estimate the output force, $F_L$: $F_L = N[X_m(\Theta) - X_s]K(\Theta)$. In some embodiments, the twisted string actuator system of FIG. 2 additionally comprises a controller for controlling motor 200.

Figure 3:
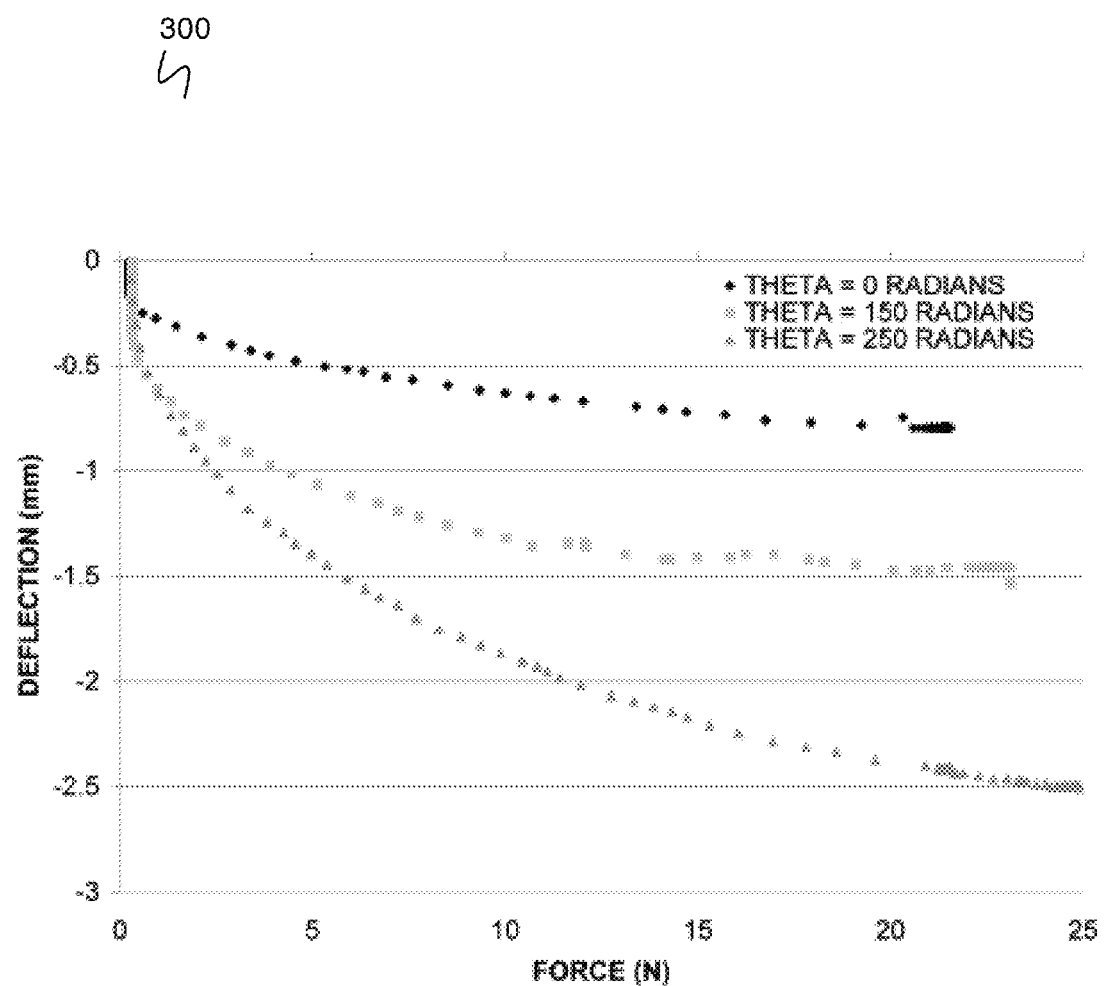
FIG. 3 is a diagram illustrating an embodiment of a relationship between a deflection and a force.

FIG. 3 is a diagram illustrating an embodiment of a relationship between a deflection and a force. In some embodiments, relationship 300 comprises measured data. In the example shown, relationship 300 comprises the relationship between a deflection and a force (e.g., a spring constant) for different values of Theta (e.g., rotation of a motor shaft—for example, the shaft of motor 200 of FIG. 2). Relationship 300 is used to model the spring stiffness of a particular twisted string transmission (e.g., transmission 202 of FIG. 2). Testing was performed by rotating the motor shaft to a desired position Θ (measured in radians). Incremental force, measured with a load cell, was then applied to the load (e.g., load 204 of FIG. 2), and the deflection was measured using an encoder. As shown in the chart, the transmission behaves almost as a linear spring when it is unwound, Θ=0. But as it is wound up, the stiffness, k, becomes increasingly non-linear. The following equation for spring constant of the transmission was derived from the experimental data:

$$\Delta p = L_0(1+F_i/k) - \sqrt{L_0^2(1+F_i/k)^2 - r^2\Theta^2},$$

where $\Delta p$ is the deflection of the string, $L_0$ is the unwound length of the sting, $F_i$ is the input force, k is the spring stiffness, r is the string diameter, and Θ is the motor position in radians. In some embodiments, other equations are derived that also describe this relationship, including the empirical fitting of non-linear (polynomial, exponential, etc.) functions. In some embodiments, a controller for controlling the string transmission calculates force and/or deflection as a function of turns for the string transmission using this model. In some embodiments, the force and/or deflection is precalculated, stored in memory, and recalled by the controller during operation of the string transmission.

Figure 4:
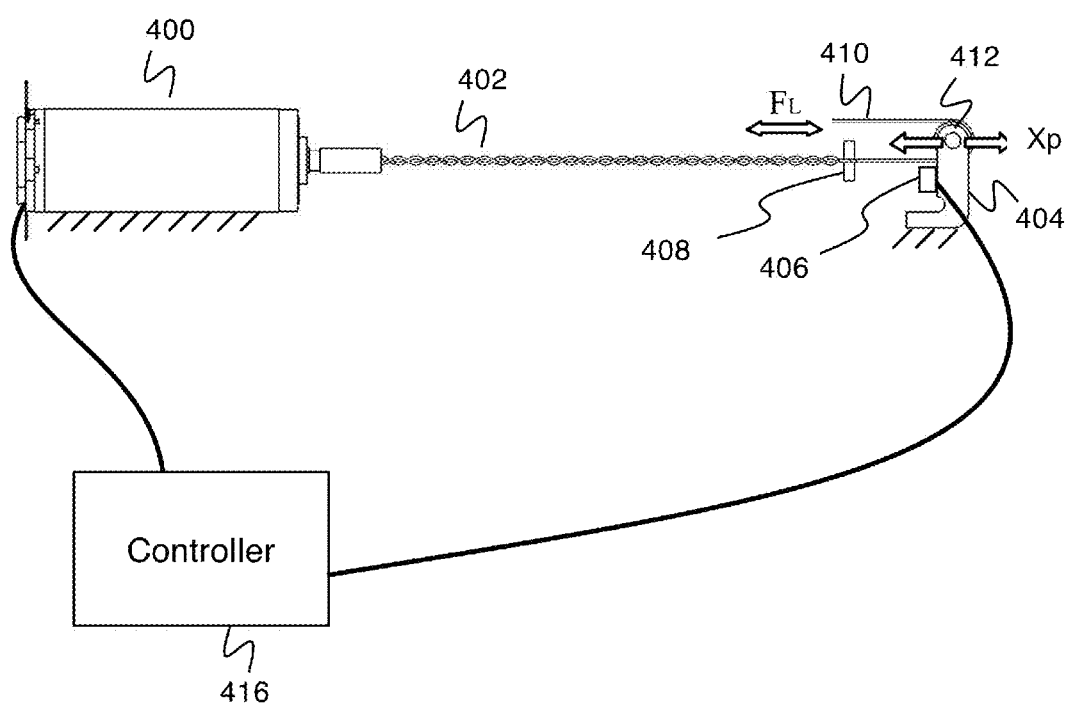
FIG. 4 is a diagram illustrating an embodiment of a twisted string actuator system.

FIG. 4 is a diagram illustrating an embodiment of a twisted string actuator system. In the example shown, the twisted string actuator system comprises motor 400, twisted string transmission 402, and bending member 404. The twisted string actuator system additionally comprises controller 416 for controlling motor 400. Bending member 404 is engineered to elastically deflect under load. Strain gauge 406 measures the displacement Xp of bending member 404 allowing the output force to be estimated. In some embodiments, estimating the output force comprises characterizing the mechanical properties of bending member 404 (e.g., spring stiffness) either through empirical data or testing. In various embodiments, strain gauge 406 comprises any appropriate kind of deflection sensor—for example, an encoder, a hall-effect sensor, an IR sensor (e.g., infrared light sensor), a capacitive sensor, a strain-gauge sensor, an LVDT (e.g., a linear variable differential transformer) sensor, etc.

In the example shown, the twisted string terminates on stop block 408 and applies tension to output cable 410. In some embodiments, output cable 410 comprises a non-rotating output cable. Output cable 410 wraps around pulley 412 and continues to terminate on a load. The output force applies tension in output cable 410 and applies a load to pulley 412. The load on pulley 412 causes a deflection of bending member 404, and its deflection Xp is measured by strain gauge 406. The sensed output force is then estimated using the equation shown below, where a (non)-linear function, N, describes the bending of bending member 404 under load: $F_L=N(X_p)$. Controller 416 controlling a twisted string transmission uses the equation for N as part of a control loop to operate the transmission. In some embodiments, controller 416 receives measurements from strain gauge 406 and controls motor 400 using a feedback control loop.

Figure 5:
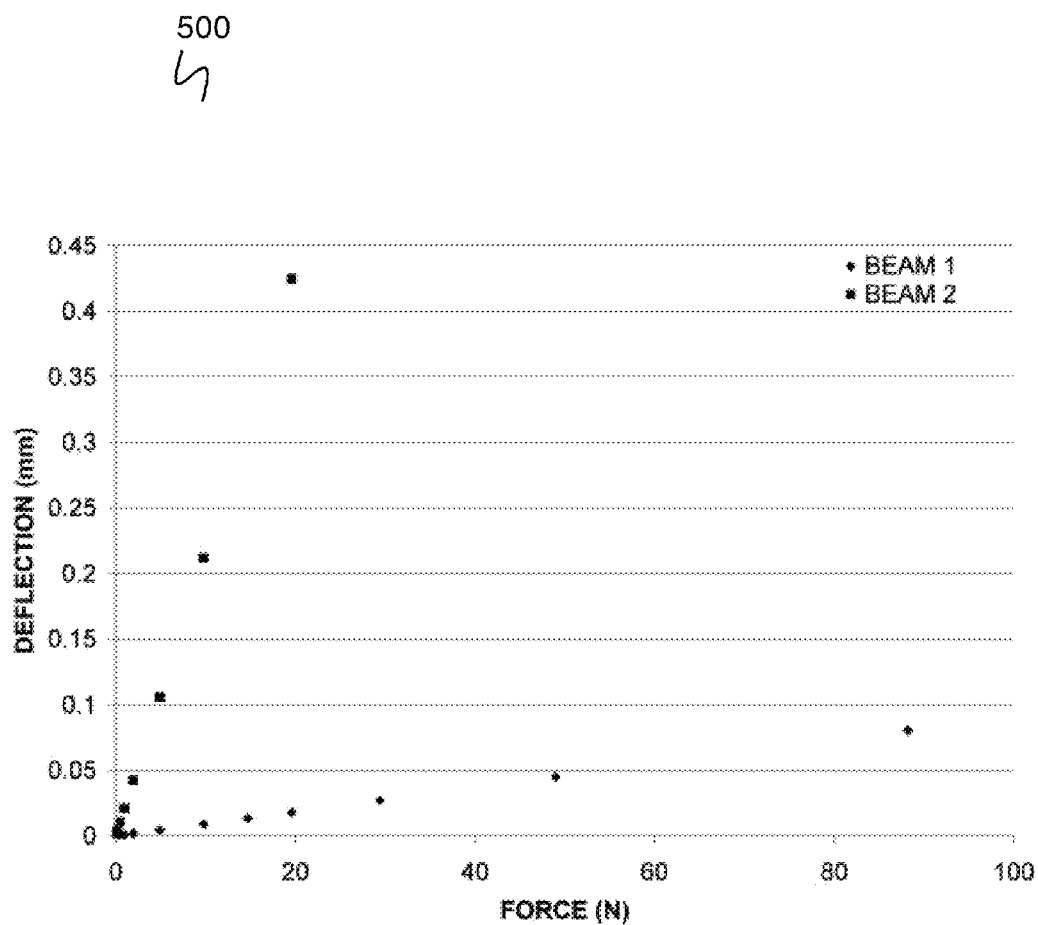
FIG. 5 is a diagram illustrating an embodiment of a relationship between a deflection and a force.

FIG. 5 is a diagram illustrating an embodiment of a relationship between a deflection and a force. In some embodiments, relationship 500 comprises measured data. In the example shown, relationship 500 comprises the relationship between a deflection and a force (e.g., a spring constant) for two different beams (e.g., deflecting members—for example, deflecting member 404 of FIG. 4). The beams deflect in a linear fashion thus the spring constant of either beam is characterized by the slope of the line. As seen in the chart, beam 1 has a much shallower slope and thus requires a higher load to deflect. Beam 2 deflects more readily under lower loads. Beam 1 would be more suitable for systems that would see higher loads, where Beam 2 would perform better in a system needing a higher resolution of the measured deflection.

Figure 6:
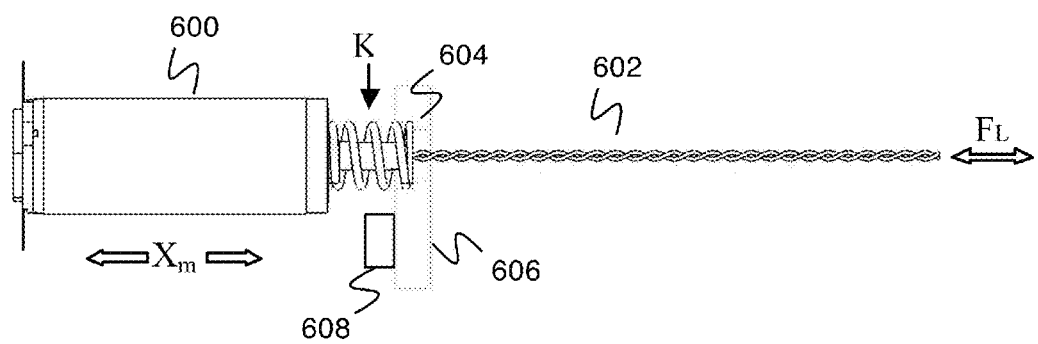
FIG. 6 is a diagram illustrating an embodiment of a twisted string actuator system.

FIG. 6 is a diagram illustrating an embodiment of a twisted string actuator system. In the example shown, the twisted string actuator system comprises motor 600 and twisted string transmission 602. The twisted string actuator system additionally comprises a controller for controlling motor 600. Motor 600 is attached to spring 604 which is mounted on fixed chassis 608. In some embodiments, a hub or gear driven by motor 600 is attached to spring 604. One end of twisted string transmission 602 is mounted on the shaft of motor 600. In some embodiments, the opposite end of twisted string transmission 602 is mounted on a fixed load. As the shaft of motor 600 turns in a first direction, twisted string transmission 602 twists, causing it to contract. As the shaft of motor turns 600 in the opposite direction, twisted string transmission 602 untwists and expands. The change in length of twisted string transmission causes a corresponding deflection, $X_m$, of spring 604. This deflection is measured by position sensor 608. In various embodiments, position sensor 608 comprises an encoder, a hall-effect sensor, a capacitive sensor, an IR sensor, a strain-gauge sensor, an LVDT sensor, or any other appropriate sensor. In some embodiments, the output load can be estimated by the following equation, where $K(\Theta)$ can be a linear or non-linear spring constant: $F_L=K(X_m) \cdot X_m$. In some embodiments, a processor controlling a twisted string transmission uses the above equation as part of a control loop to operate the transmission.

Figure 7:
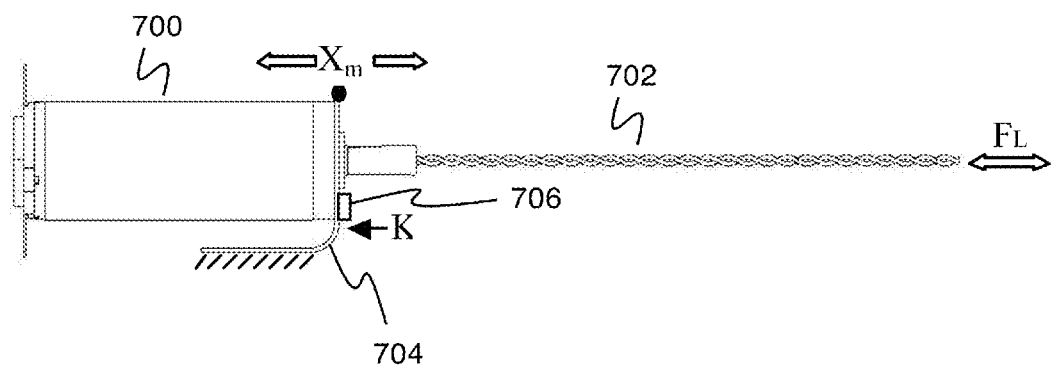
FIG. 7 is a diagram illustrating an embodiment of a twisted string actuator system.

FIG. 7 is a diagram illustrating an embodiment of a twisted string actuator system. In the example shown, the twisted string actuator system comprises motor 700 and twisted string transmission 702. The twisted string actuator system comprises a controller for controlling motor 700. Motor 700 is mounted on bending member 704, e.g., a structure that has been engineered to undergo displacement under load. Motor 700 is mounted on to a cantilever deflection beam. In some embodiments, a hub or gear driven by the motor is mounted on bending member 704. In various embodiments, bending member 700 is made out of spring steel, stainless steel, aluminum, plastic, rubber, or any another appropriate deformable material. One end of twisted string transmission 702 is mounted on the shaft of motor 700. In some embodiments, the opposite end of twisted string transmission 702 is mounted on a fixed load. As the shaft of motor 700 turns in a first direction, twisted string transmission 702 twists, causing it to contract. As the shaft of motor turns 700 in the opposite direction, twisted string transmission 702 untwists and expands. The change in length of twisted string transmission causes a corresponding deflection, $X_m$, of bending member 704. This deflection is measured by position sensor 706. In various embodiments, position sensor 706 comprises an encoder, a hall-effect sensor, a capacitive sensor, an IR sensor, a strain-gauge sensor, an LVDT sensor, or any other appropriate sensor. The output load is then estimated by the following equation, where $K(\Theta)$ can be a linear or non-linear spring constant:

$F_L=N(X_m)$. A controller controlling a twisted string transmission uses the above equation as part of a control loop to operate the transmission.

Figure 8:
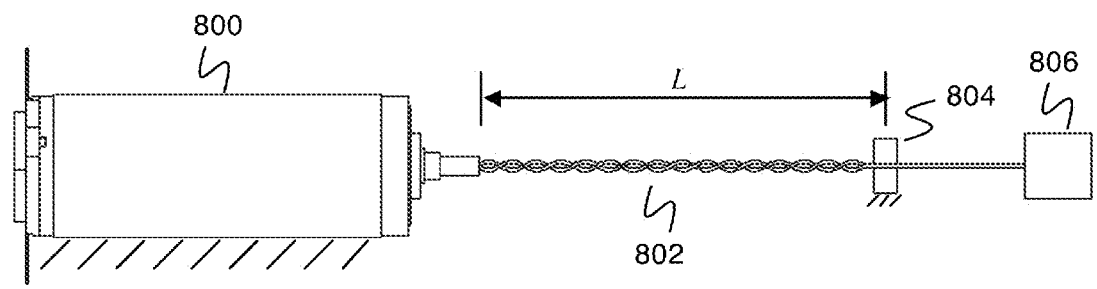
FIG. 8 is a diagram illustrating an embodiment of a twisted string actuator system.

FIG. 8 is a diagram illustrating an embodiment of a twisted string actuator system. In the example shown, the twisted string actuator system comprises motor 800 and twisted string transmission 802. The twisted string actuator system comprises a twisted string actuator system with increased actuator throw. The twisted string actuator system comprises block 804 located between motor 800 and load 806. The strings comprising twisted string transmission 802 are twisted between motor 800 and block 804, and not twisted between block 804 and load 806. The effect of block 804 is to hold fixed the length that the strings have to wind over. As the transmission winds, more string is fed into the twisting side from the unwound side. By not allowing the length of the winding side to decrease, a greater overall length of unwound string can be wound up in the transmission because it take more winds for the string to reach its density limit. In one test, it was found that a standard transmission could contract up to 54% of its original length, but a transmission using this improved method could contract as much of 86% of the original length. In various embodiments, block 804 comprises a peg, a pin, a block, a roller, a pulley, multiple rollers, or any other appropriate block.

Figure 9:
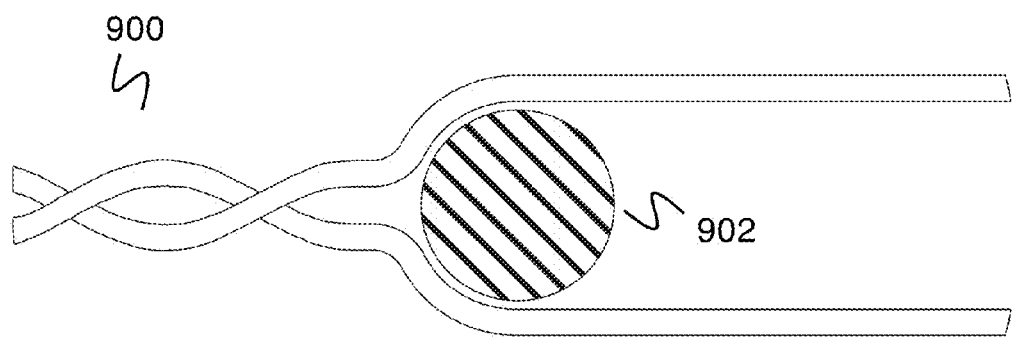
FIG. 9 is a diagram illustrating an embodiment of a twisted string transmission including a block.

FIG. 9 is a diagram illustrating an embodiment of a twisted string transmission including a block. In the example shown, strings 900 comprises strings of a twisted string transmission (e.g., twisted string transmission 802 of FIG. 8) and block 902 comprises a block for a twisted string transmission (e.g., block 804 of FIG. 8). Block 902 comprises a pin. Block 902 places a physical separation within the transmission length to increase the length of string that can be wound within the transmission. To the left of block 902, strings 900 wind or twist normally. To the right of block 902, strings 900 are no longer able to twist. Strings 900 slide past block 902 as the transmission winds and unwinds or twists and untwists. Strings 900 rub on block 902 as the transmission winds and unwinds or twists and untwists. This rubbing causes transmission friction and string fatigue.

Figure 10:
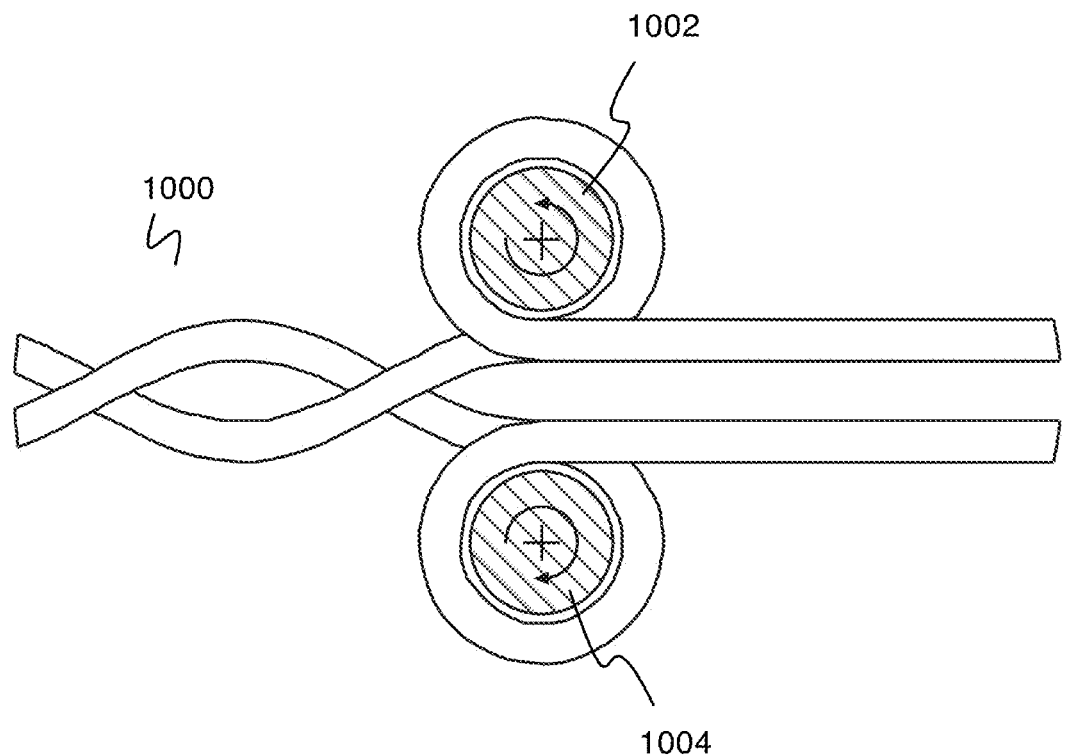
FIG. 10 is a diagram illustrating an embodiment of a twisted string transmission including a block.

FIG. 10 is a diagram illustrating an embodiment of a twisted string transmission including a block. In the example shown, strings 1000 comprises strings of a twisted string transmission (e.g., twisted string transmission 802 of FIG. 8) and pulley 1002 and pulley 1004 together comprise a block for a twisted string transmission (e.g., block 804 of FIG. 8). Strings 1000 comprises two strings. Pulley 1002 and pulley 1004 place a physical separation within the transmission length to increase the length of string that can be wound within the transmission. To the left of pulley 1002 and pulley 1004, strings 1000 wind normally. To the right of pulley 1002 and pulley 1004, strings 1000 are no longer able to twist. Strings 1000 wrap around pulley 1002 and pulley 1004. In some embodiments, strings 1000 wrap multiple times around pulley 1002 and pulley 1004. Providing each of strings 1000 with its own pulley to wrap around reduces abrasive effects on the string and the impedance within the transmission. In various embodiments, pulley 1002 and pulley 1004 comprise pulleys, rollers, bearings, bushings, or any other components that enable low-friction rotation. The outcome of this is improved transmission lifespan, improved transmission efficiency, and improved actuator control of position and force due to the lowered friction and impedance.

In some embodiments, a single pulley is used, where the two strings wrap one or more times around the pulley in the same direction. This configuration can be simpler than a configuration involving multiple pulleys to produce, but experiments have shown that it can be less effective at increasing the transmission lifespan.

In some embodiments, it is desirable to avoid radial separation of the twisted strings as it leaves the transmission. Increased separation increases transmission non-linearity and decreases its stiffness. A minimal separation (twice the string radius) can be achieved by wrapping the string around the pulleys, one or more times.

In one set of tests, twisted string transmission including a block comprising a pin was compared with a twisted string transmission including a block comprising two pulleys. The two transmission designs were cycled to failure. In the transmission including a block comprising a pin, the block comprised a pin made from Teflon®, and on average the transmission cycled about 12,900 times before failure. In the configuration including a block comprising dual pulleys, the average life of the transmission was measured to be an average of 23,500 cycles.

Figure 11:
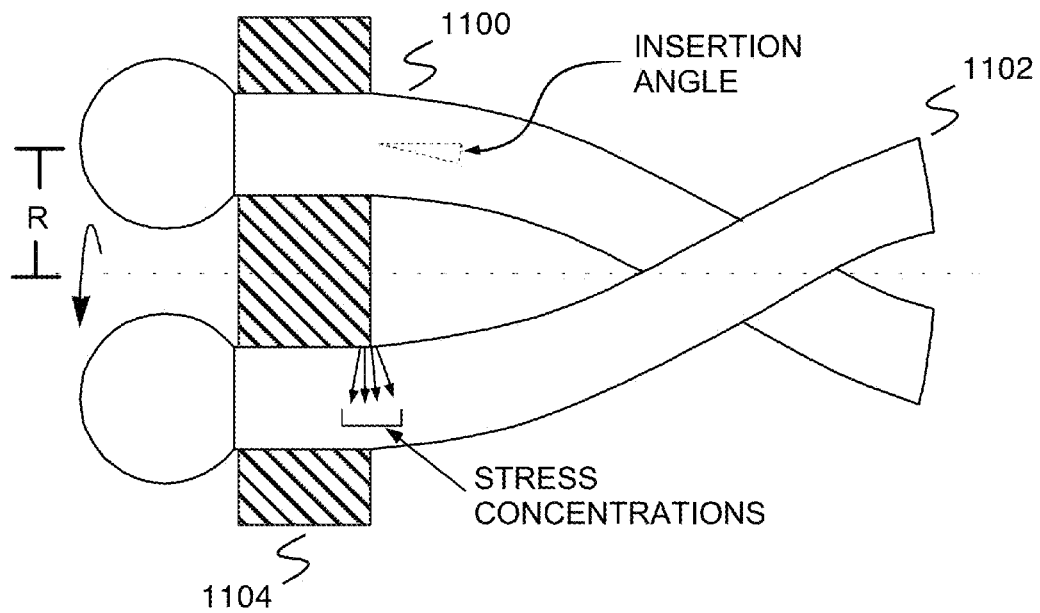
FIG. 11 is a diagram illustrating an embodiment of a string mount.

FIG. 11 is a diagram illustrating an embodiment of a string mount. In some embodiments, the diagram of FIG. 11 comprises a string mount for a twisted string transmission. In the example shown, string 1100 and string 1102 are mounted on mount 1104. In various embodiments, mount 1104 is a part of a motor, a load, a hub driven by a motor, a gear driven by a motor, or any other appropriate mount. The twisting of string 1100 and string 1102 causes the strings to be pulled at an angle to the perpendicular insertion into mount 1104. The insertion angle changes as the strings twist and untwist, causing local friction and wear, decreasing the life of the string. The local bending angle additionally causes a local stress concentration, further decreasing the life of the string.

Figure 12:
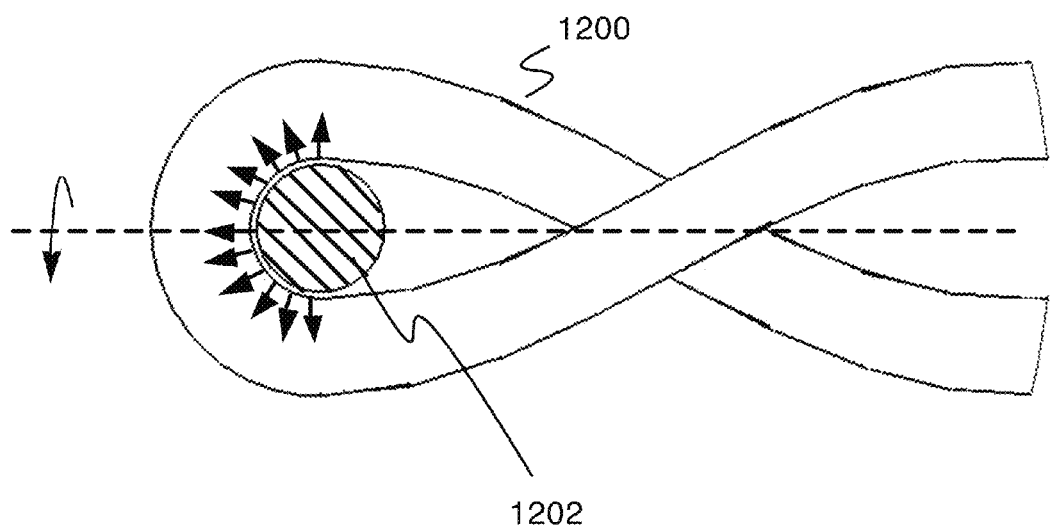
FIG. 12 is a diagram illustrating an embodiment of a string mount.

FIG. 12 is a diagram illustrating an embodiment of a string mount. In some embodiments, a string mount of FIG. 12 reduces stress concentrations and abrasion in the string at the attachment point of a twisted string transmission in comparison to the string mount of FIG. 11. In the example shown, the string mount comprises string 1200 wrapped around pin 1202. String 1200 is wrapped once around pin 1202. In some embodiments, string 1200 is wrapped multiple times around pin 1202. In some embodiments, the string mount of FIG. 12 is advantageous because of its simplicity—it does not require any knots or mounting hardware. In some embodiments, the string mount of FIG. 12 is advantageous because it distributes stress more evenly within the twisting string (e.g., compared with the string mount of FIG. 11). Stress within string 1200 is shown by the set of arrows radiating out from pin 1202. The string mount of FIG. 12 is advantageous because string 1202 does not come in contact with any sharp edges to provide additional wear.

Figure 13:
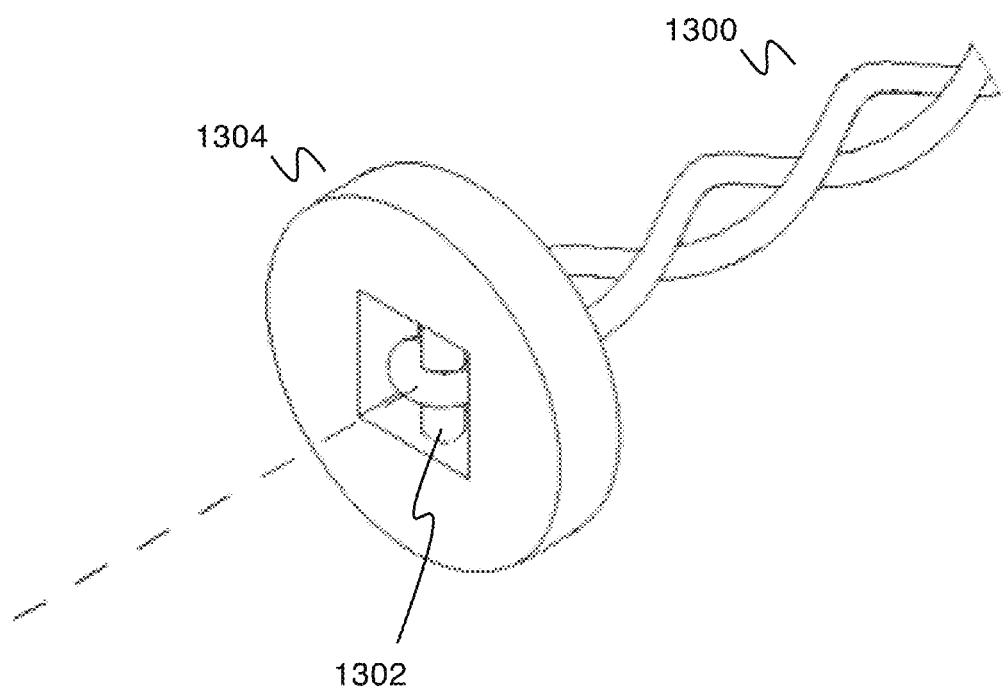
FIG. 13 is a diagram illustrating an embodiment of a string mount.

FIG. 13 is a diagram illustrating an embodiment of a string mount. In the example shown, the string mount comprises string 1300 wrapped around pin 1302 of mount 1304. In some embodiments, the string mount of FIG. 13 comprises an implementation of the string mount of FIG. 12. In some embodiments, mount 1304 is coupled to a motor or a load.

Figure 14:
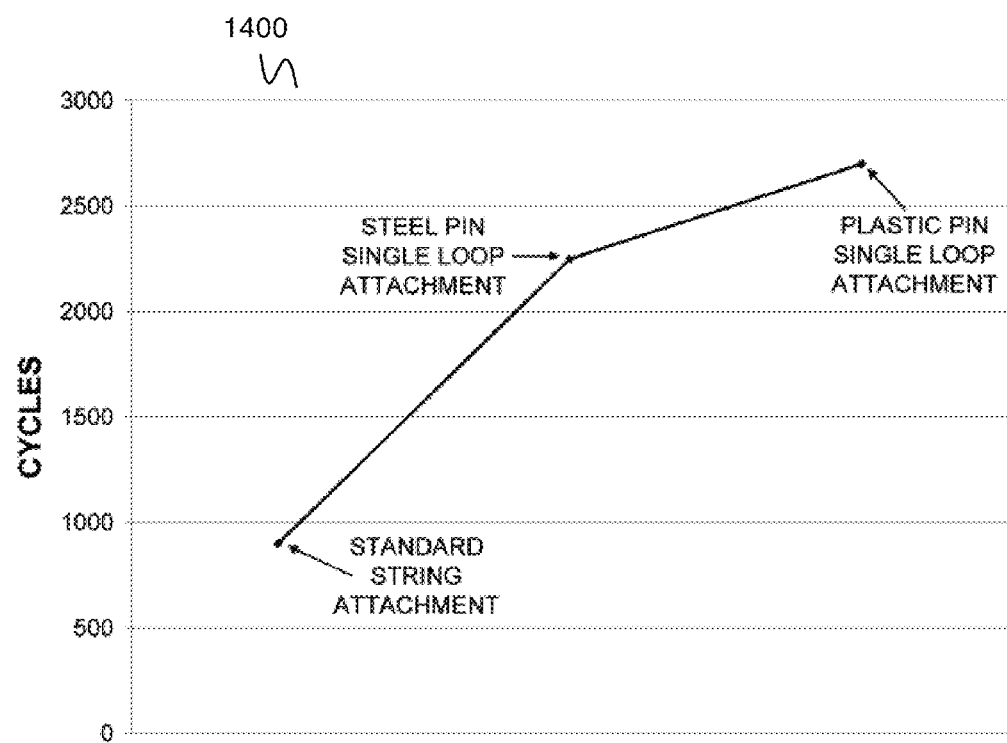
FIG. 14 is a diagram illustrating an embodiment of testing results.

FIG. 14 is a diagram illustrating an embodiment of testing results. In the example shown, graph 1400 comprises a graph showing the number of cycles a twisted string transmission was able to perform when the strings were mounted in a standard string attachment (e.g., using the string mount of FIG. 11), when the strings were mounted using a string mount including a string wrapped around a pin (e.g., using the string mount of FIG. 13), where the pin comprises a steel pin, and when the strings were mounted using a string mount including a string wrapped around a pin (e.g., using the string mount of FIG. 13), where the pin comprises a plastic pin. In this case, a cycle is defined as one sequence where the transmission winds up to a set number of twists, inducing an axial force in the transmission, and then unwinds to the original number of twists, releasing the induced force. The configuration of a standard string attachment lasted 900 cycles before failure, the configuration including a string wrapped around a steel pin lasted approximately 2250 cycles before failure, and the configuration including a string wrapped around a plastic pin lasted approximately 2700 cycles before failure.

Figure 15:
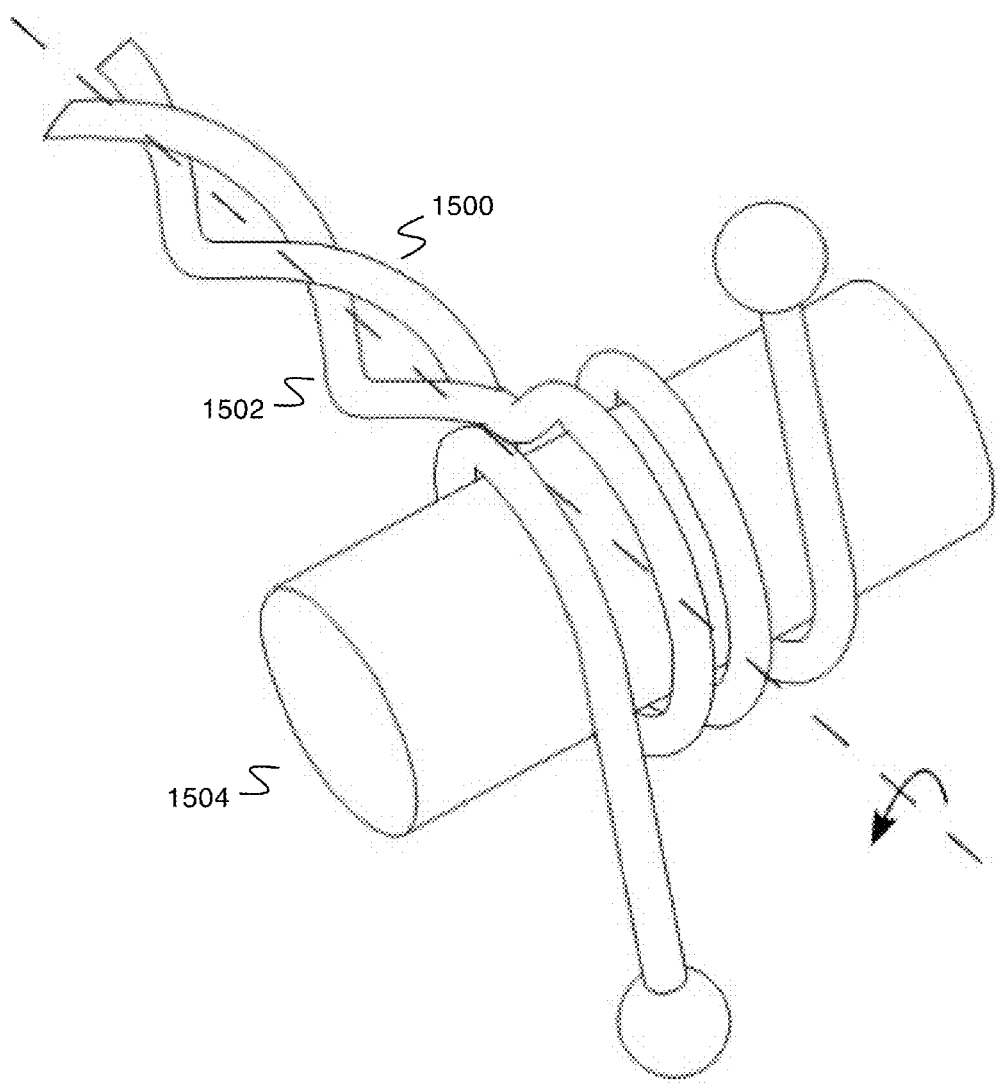
FIG. 15 is a diagram illustrating an embodiment of a string mount.

FIG. 15 is a diagram illustrating an embodiment of a string mount. In the example shown, the string mount comprises string 1500 and string 1502 wrapped around pin 1504. String 1500 and string 1502 are each wrapped once around pin 1504. In some embodiments, string 1500 and string 1502 are each wrapped multiple times around pin 1504. In some embodiments, string 1500 and string 1502 comprise separate strings anchored separately beyond pin 1504. In some embodiments, only one string 1500 is used, which is wrapped one or more times around pin 1504 and then anchored beyond the pin. The mode of actuation remains the same for one or multiple strings. The string mount increases the tensile strength of a twisted string transmission. For example, a transmission utilizing two strings can have twice the tensile strength of a similar transmission only using one string. In some embodiments, more than one pin is used—for example, two pins are used where one pin is used for two twisted strings, three pins are used where one pin is used for three twisted strings, etc. The use of more than one pin can be beneficial to reduce the separation between the strands. In some embodiments, the string mount of FIG. 15 (e.g., including one pin 1504 or multiple pins) can be mounted on a mount (e.g., as in the string mount of FIG. 13). In some embodiments, the string mount of FIG. 15 (e.g., including one pin 1504 or multiple pins) can be mounted on or in any other appropriate structure that can support one or more pins and be attached to the transmission input drive or output load of a twisted string transmission.

Figure 16:
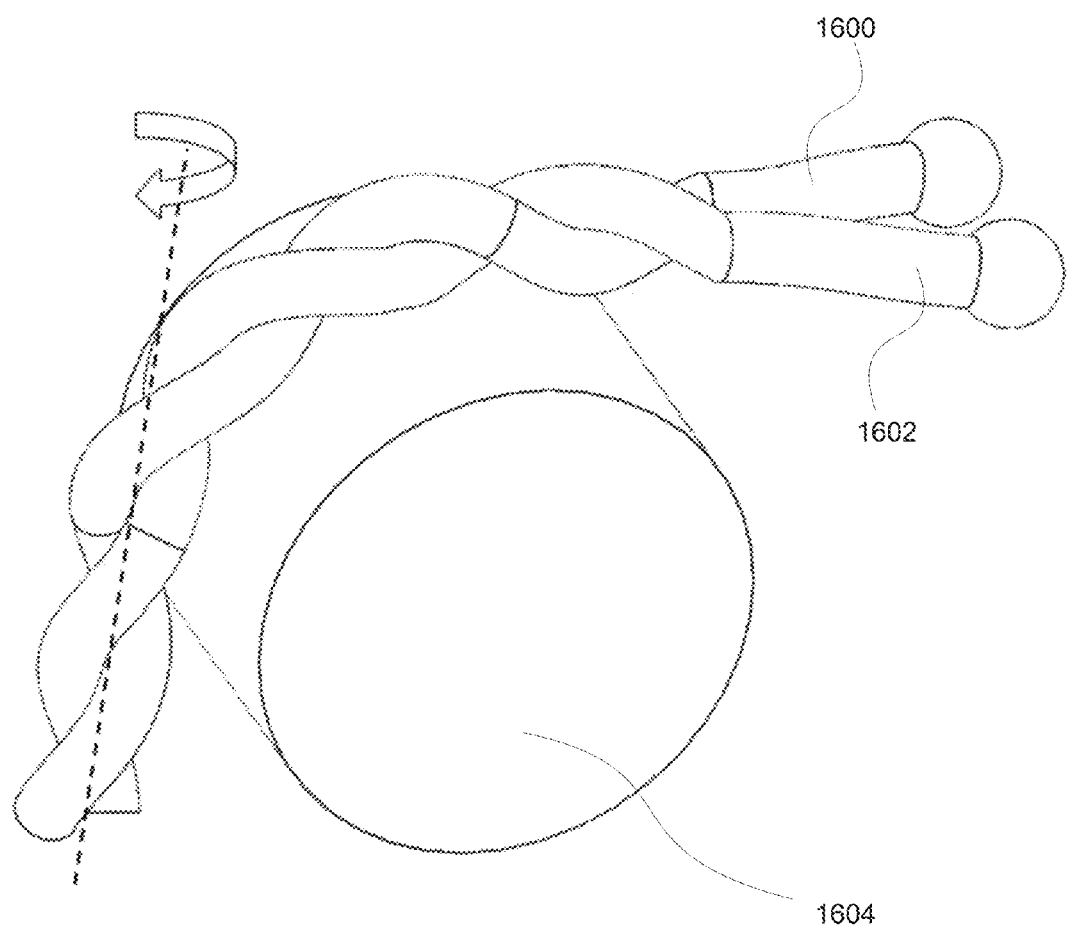
FIG. 16 is a diagram illustrating an embodiment of a string mount.

FIG. 16 is a diagram illustrating an embodiment of a string mount. In the example shown, the string mount comprises string 1600 and string 1602 wrapped around pin 1604. String 1600 and string 1602 are twisted together and are then wrapped around pin 1604. String 1600 and string 1602 are anchored beyond pin 1604. In some embodiments, the string mount of FIG. 16 can be mounted on a mount (e.g., as in the string mount of FIG. 13). In some embodiments, the string mount of FIG. 16 is advantageous because it reduces the stresses applied to string 1600 and 1604, extending the life of the twisted string transmission.

Figure 17:
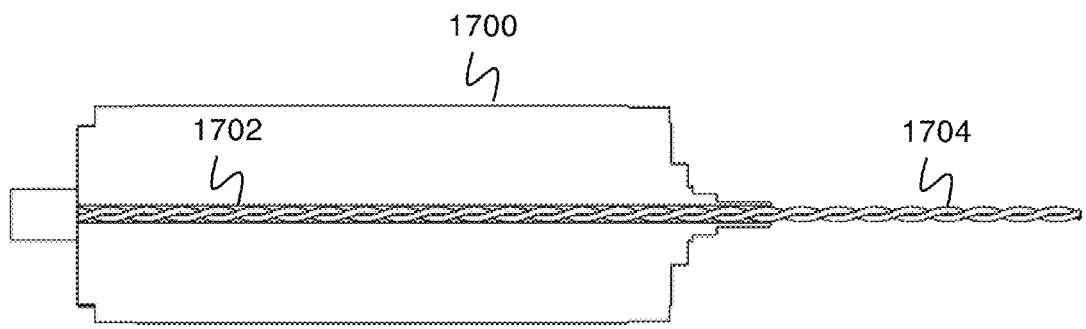
FIG. 17 is a diagram illustrating an embodiment of a compact twisted string actuator.

FIG. 17 is a diagram illustrating an embodiment of a compact twisted string actuator. In the example shown, the compact twisted string actuator comprises motor 1700. Motor 1700 comprises hollow shaft 1702. Hollow shaft 1702 replaces a typical solid shaft of motor 1700. Strings 1704 extend through hollow shaft 1702 and are mounted at the back of motor 1700. Mounting strings 1704 at the back of motor 1700 allows the length of motor 1700 to be used as part of the transmission length. The overall usable space for the transmission is thus increased by the length of motor 1700. In some embodiments, a lubrication (e.g., grease, oil, etc.) is applied inside hollow shaft 1700. The lubrication is shielded from possible contaminants and increases the life of the string transmission.

In some embodiments, string 1704 is affixed to the inside of hollow shaft 1702, and extends both out the front of motor 1700 (e.g., as shown in FIG. 17) and out the backside of motor 1700 (e.g., through a hole not present in FIG. 17). Extending string 1704 out both the front and back of motor 1700 allows a twisted string transmission to be employed on both sides of the motor. This allows for two loads to be driven simultaneously, for simple implementation of an antagonistic pull-pull type actuator, or for the motor to translate itself bi-directionally by affixing the two transmissions to a stationary structure. In addition, the string may be affixed to the motor output shaft and exit the back-side of the motor, allowing for greater flexibility when packaging the motor in to an actuator.

Figure 18:
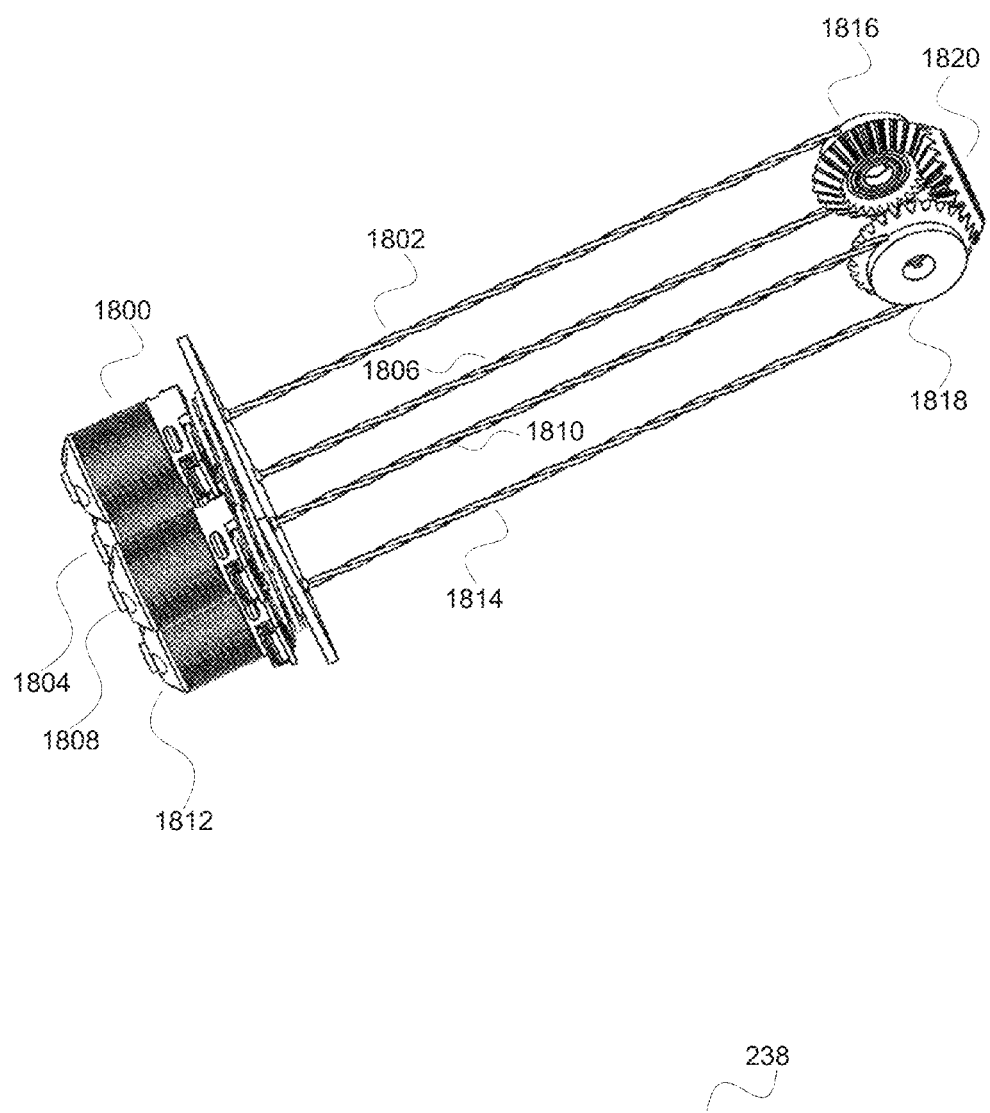
FIG. 18 is a diagram illustrating an embodiment of a differential drive transmission using twisted string actuators.

FIG. 18 is a diagram illustrating an embodiment of a differential drive transmission using twisted string actuators. In the example shown, the differential drive comprises motor 1800 driving string 1802, motor 1804 driving string 1806, motor 1808 driving string 1810, and motor 1812 driving string 1814. String 1802 and string 1806 are both connected to gear 1816, and when driven in opposite directions (e.g., string 1802 contracts while string 1806 expands, or string 1806 contracts while string 1802 expands) cause gear 1816 to turn. String 1810 and string 1814 are both connected to gear 1818, and when driven in opposite directions (e.g., string 1810 contracts while string 1814 expands, or string 1814 contracts while string 1810 expands) cause gear 1818 to turn. When gear 1816 and 1818 turn in the same direction (e.g., both clockwise or both counterclockwise as viewed from their backside), gear 1820 is caused to turn. In some embodiments, the transmission of FIG. 18 causes gear 1820 to turn with much greater force than is produced by motor 1800, motor 1804, motor 1808, and motor 1812.

In some embodiments, due to the nature of the twisted string actuator, i.e. repeated twisting and untwisting of one or more strings as a means of transmitting power, selection of the string material as well as the construction of the rope weave itself must be carefully considered. String/rope is typically a collection of long individual fibers that are twisted, braided, or woven together in a design intended to withstand tensile loads.

In some embodiments, synthetic fibers including aramids, polyamides, polyesters, and polyethylene generally have better mechanical properties than non-synthetics and thus were the focus during the research and selection phase. Crucial properties for the twisted string transmission system include:

Tensile strength—the ability of a material to be subjected to tensile forces without failure;

Abrasion resistance—how abrasive a fiber is. The twisted string transmission repeatedly twists and untwists resulting in individual fibers within the string rubbing against each other. The more abrasive a fiber is the more readily individual fibers wear against each other and fracture under load. Fracturing of individual fibers can lead to elongation of the transmission. This elongation can result in loss of tension in the transmission and lowered output stiffness. Failure of the transmission will also occur under load when enough individual fibers have been fractured. Friction between fibers— how easily an individual fiber can slide against a similar fiber. Related to a fiber's abrasiveness, higher friction between the fibers will result in heat generation. This will lower the efficiency of the drive as input energy is lost in the form of heat. Mechanical properties also change as fibers heat up. Certain materials experience more rapid degradation in performance and life under sustained elevated temperatures;

Flexibility—a fiber's ability to repeatedly bend over a given radius without affecting its mechanical properties;

Creep—elongation of the fibers under sustained load. Certain fibers will stretch over time under load. Depending on the fiber and the load conditions they may or may not return to their original length. Elongation in this transmission can lead to a loss of tension in the system and lower output stiffness; and Environmental considerations—certain fibers will break down when in the presence of environmental elements such as UV rays.

Figure 19:
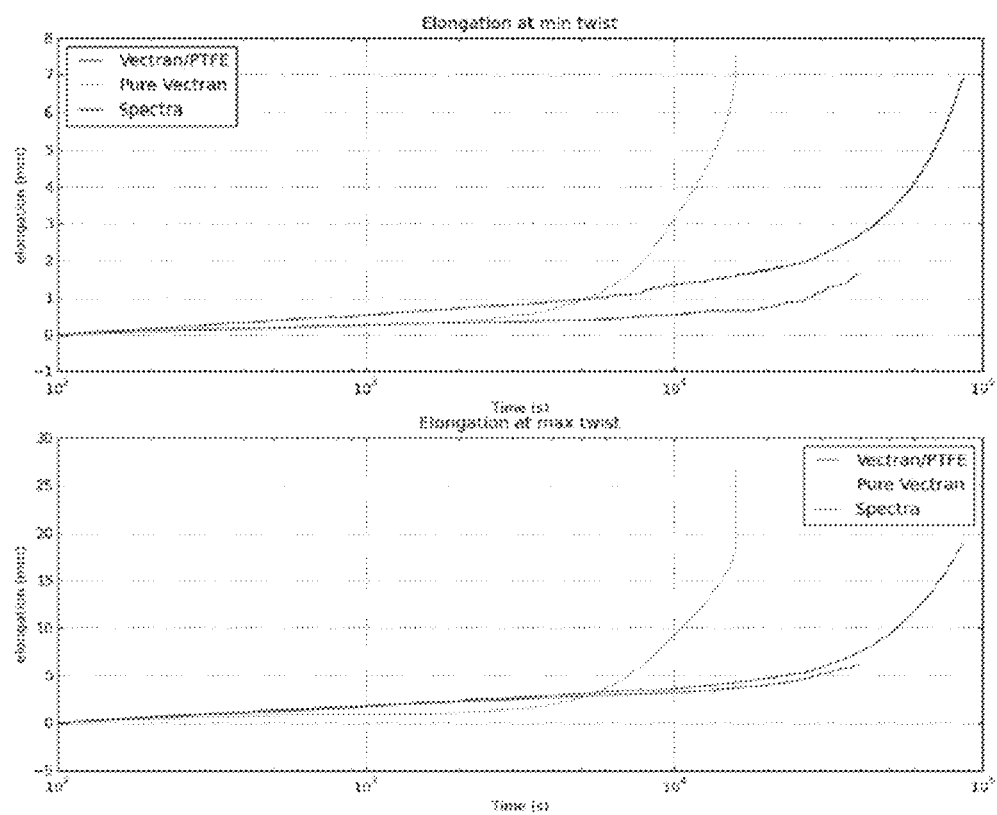
FIG. 19 is a graph illustrating an embodiment of tests regarding elongation of fibers.

FIG. 19 is a graph illustrating an embodiment of tests regarding elongation of fibers. In the example shown, three different fibers are compared: pure Vectran™, a blend Vectran and PTFE fibers, and pure spectra. The length of the twisted string transmission was tracked over time as the string was repeated twisted and untwisted to the same positions. Each string had the same rated break strength, and was cycled under the same load and range of travel. Vectran (polyester) has a high tensile strength (~3000 MPa), exhibits low to zero creep, has high tensile strength, remains stable at elevated temperatures (up to 220° C.), and does not break down in the presence of UV light, but pure Vectran fibers are relatively abrasive. Abrasion can be combated by coating the fibers with a variety of compounds including polyurethane and polyester or weaving in fibers of PTFE for lubrication. Spectra® (polyethylene) has a similar tensile strength to Vectran as well as being impervious to UV light. It is self lubricating, thus having greater abrasion resistance (compared to pure vectran fibers) but it will continually creep under sustained load. It also has a lower tolerance to elevated operating temperatures and will begin to weaken at temperatures as low as 80° C. Initially the pure Vectran shows the lowest elongation, but as it begins to abrade itself the transmission begins to elongate at a rapid pace. This eventually leads to run away elongation and transmission failure. The spectra transmission elongates at a fairly constant rate through most of its life, until it too begins run away elongation and eventual failure. The Vectran/PTFE blend exhibited the least amount of elongation over its life, but also failed more abruptly than the other two tests and at fewer cycles than the Spectra.

String construction and lubrication are explored. Initial testing was conducted with string/rope constructed with both 8 and 12 strand braids. Cycle life on these transmissions was poor ranging from a 500 to 5000 cycles. During these tests, the load on the transmission was between 5% to 15% of the rated breaking strength of the string.

Adding lubrication such as penetrating oil lubrication or lithium based grease to the string increased the cycle life up to 100,000 cycles under similar loading conditions. Long groups of un-woven fibers were also cycled but did not perform any better than braided equivalents.

With unsatisfactory cycle life numbers, rope/string manufactures were utilized to optimize the performance of the twisted string transmission through custom rope design. Since the transmission is always twisting in the same direction, a braided design, where fibers are woven in opposite directions means that only half of the fibers are in tension, the other half are unloaded and potentially leading to higher abrasion as they slide past the loaded fibers at a severe angle.

Three strand twisted rope construction was ultimately determined to have the best performance. A balanced construction was tested. This comprised three groupings (strands) of fibers, each group twisted in one direction. The three strands are then twisted about each other in the opposite direction. This balanced design creates a bundle that will not untwist under tension.

This construction outperformed all previous tests. When a lubricant was used, over 600,000 cycles were achieved without failure and with minimal signs of wear. This test was cycled under load at 7% of the rated breaking strength.

Since the twisting of the string is always controlled and it is never allowed to completely untwist there is no need for the rope construction to be balanced. It is theorized that even better performance can be achieved with an unbalanced construction, i.e., both the individual groups of fibers and the three strands are all twisted in the same direction. Testing on this construction has not been completed. Also, performance may be improved by using fewer fibers per strand and more overall strands. This construction would create a smoother surface along the length of the rope, allowing it to twist and slide past opposing sections of rope.

Figure 20:
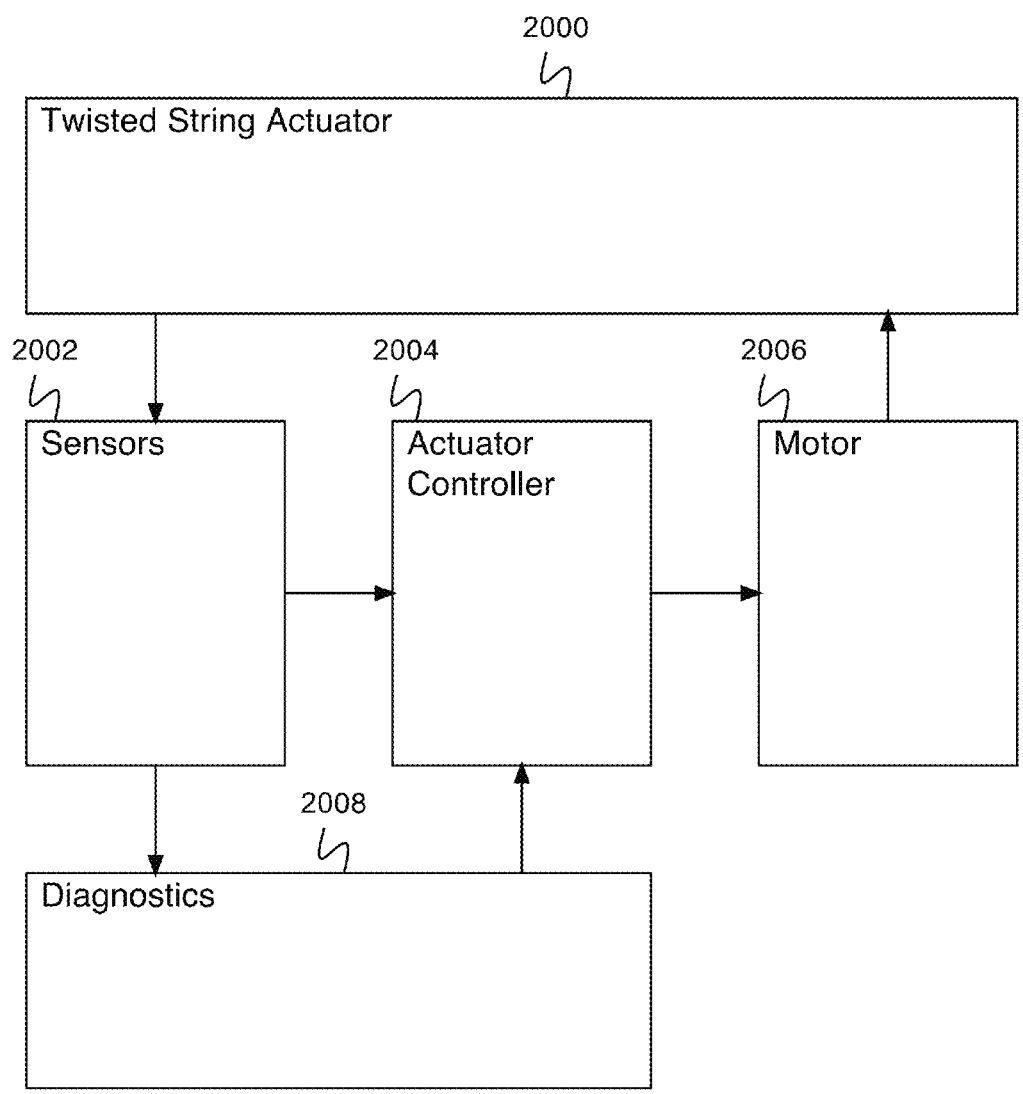
FIG. 20 is a block diagram illustrating an embodiment of a system for diagnostic monitoring of a twisted string actuator system.

FIG. 20 is a block diagram illustrating an embodiment of a system for diagnostic monitoring of a twisted string actuator system. In some embodiments, the system of FIG. 20 comprises a system for diagnostic monitoring of the twisted string actuator system of FIG. 1. In the example shown, twisted string actuator 2000 comprises a twisted string actuator. Sensors 2002 comprise sensors for monitoring twisted string actuator 2000. In various embodiments, sensors 2002 comprise an output position sensor, an output torque sensor, a motor angle sensor, a motor current sensor, or any other appropriate sensor. Actuator controller 2004 comprises an actuator controller for controlling an actuator (e.g., twisted string actuator 2000). In some embodiments, actuator controller 2004 comprises a processor. In some embodiments, actuator 2004 comprises an analog controller. Actuator controller 2004 receives sensor data from sensors 2002 and diagnostic data from diagnostics 2008 and produces control signals to control motor 2006. Motor 2006 comprises a motor for providing rotational motion to twisted string actuator 2000. Diagnostics 2008 comprise diagnostics for receiving sensor data from sensors 2002 and determining diagnostic information describing the state of actuator 2004. In various embodiments, diagnostics 2008 receives information from an output position sensor, an output torque sensor, a motor angle sensor, a motor current sensor, or any other appropriate sensor. In various embodiments, diagnostics 2008 determines the probability or any other appropriate metric for a transmission fault or failure, the need of a transmission recalibration or service, a transmission overload or misuse, a string elongation or breakage, or any other appropriate failure condition. In some embodiments, diagnostics 2008 recalibrates the control parameters of actuator controller 2004 on a periodic basis (e.g., to account for gradual string elongation or other gradual changes).

In some embodiments, several performance aspects of the twisted string actuator are monitored using the existing sensors that are already in place with the primary purpose of actuator control. It is advantageous to track and monitor aspects of the actuators operation to predict or detect failures within the system, as well as tracking wear of the system over time that can lead to performance degradation and the need for service. The following diagnostics can easily be implemented:

Monitor transmission performance over time of crucial components including motor, bearings, and strings, by monitoring input and output angle sensors, motor current consumption and measured output torque. Ongoing monitoring of these sensors can be compared to collected data throughout the life of the transmission along with empirical data collected from similar transmission. These comparisons can be used to predict when service will be needed, issue warnings, and shutdown the system in the event of imminent failure;

Elongation or breakage of the string by comparing the output angle sensor to the motor angle sensor over time;

Periodic calibration and required service notifications based on string elongation (as measured above), motor input current, transmission output torque; and System overload or misuse.

Figure 21:
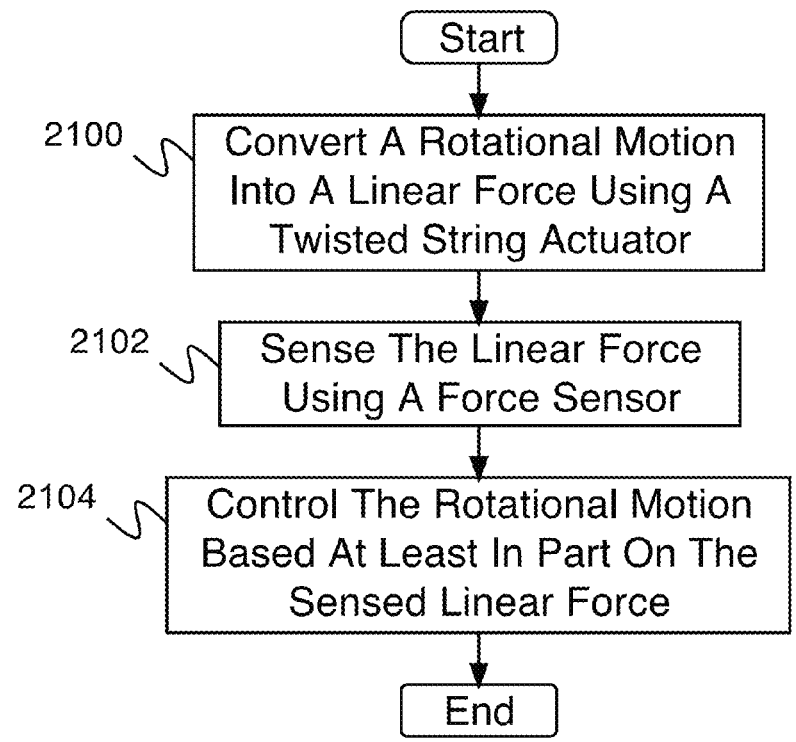
FIG. 21 is a flow diagram illustrating an embodiment of a process for a twisted string transmission system.

FIG. 21 is a flow diagram illustrating an embodiment of a process for a twisted string transmission system. In some embodiments, the process of FIG. 20 comprises a process for the twisted string actuator system of FIG. 1. In the example shown, in 2000, a rotational motion is converted into a linear force using a twisted string actuator. For example, the rotational motion produced using a motor is converted into a linear force by twisting strings—an increase in the twist shortens the length of the strings and a decrease in the twist lengthens the length of the strings. In 2002, a linear force is sensed using a force sensor. In 2004, a rotational motion is controlled based at least in part on the sensed linear force. For example, a controller (e.g., a processor) uses the sensed force by the force sensor to determine a rotational motion to apply to the twisted string actuator.

Figure 22:
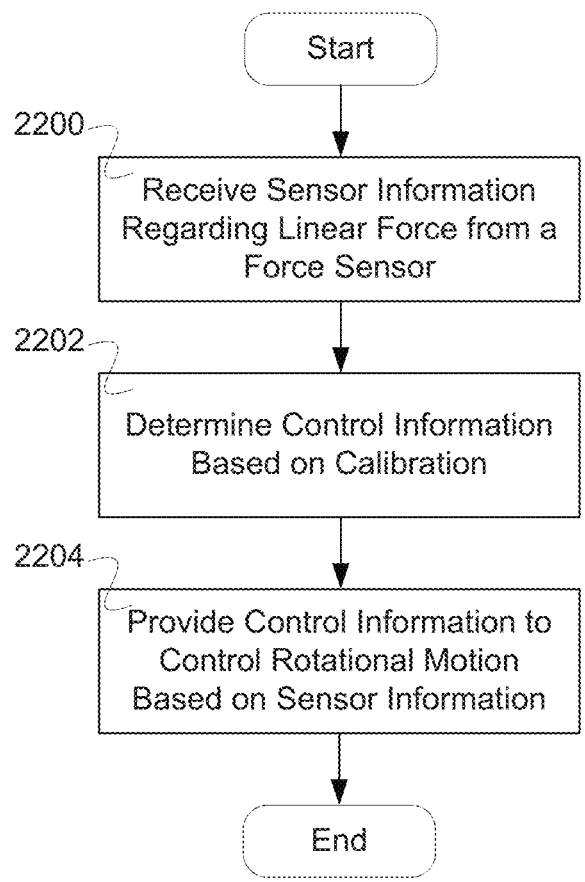
FIG. 22 is a flow diagram illustrating an embodiment of a process for a twisted string transmission system.

FIG. 22 is a flow diagram illustrating an embodiment of a process for a twisted string transmission system. In the example shown, in 2200 sensor information is received regarding the linear force from a force sensor. For example, a controller (e.g., a processor) receives a sensor measurement regarding a force experienced by the twisted string. In 2202, control information is determined based on a calibration. For example, control information is determined from the relation of rotational position or motion of a motor that twists the string and the force experienced by a load at the end of the twisted string. The calibration is measured during an initialization and periodically to recalibrate the relation between the rotation position/motion and the force as experienced by a load coupled to the end of the twisted string. The controller uses the calibration to map or determine a value of the rotational position or motion using the input desired force, position, or desired behavior of the twisted string actuator. In 2204, the control information is provided to control the rotational motion based on the sensor information. For example, the motor of a twisted string actuator is provided with a control signal that indicates a desired behavior of the motor. The desired motor behavior maps to a desired actuator behavior (e.g., position, force, motion, etc.) according to a calibration curve.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A twisted string transmission system, comprising:
a twisted string actuator for converting a rotational motion into a linear force;
a force sensor for sensing the linear force;
a controller for:
receiving sensor information regarding the linear force from the force sensor; and
providing control information to control the rotational motion based at least in part on the sensor information; and
a block for extending the actuator throw of the twisted string actuator, wherein the block comprises two pulleys and each string of the twisted string actuator is wrapped around a separate pulley and is separately anchored beyond the separate pin such that beyond the pin, strings of the twisted string actuator are untwisted.

2. The twisted string transmission system of claim 1, wherein the controller controls the rotational motion based at least in part on the sensed linear force.

3. The twisted string transmission system of claim 1, wherein the controller controls the rotational motion based at least in part on a model of the relationship between the linear force and a load displacement.

4. The twisted string transmission system of claim 1, further comprising a motor for providing the rotational motion.

5. The twisted string transmission system of claim 1, wherein the force sensor comprises one of the following: an encoder, a hall-effect sensor, a capacitive sensor, an IR sensor, a strain-gauge sensor, or an LVDT sensor.

6. The twisted string transmission system of claim 1, further comprising a bending member for bending in response to the linear force.

7. The twisted string transmission system of claim 6, wherein the bending member bends with a linear spring constant.

8. The twisted string transmission system of claim 1, further comprising a spring for expanding or contracting in response to the linear force.

9. The twisted string transmission system of claim 1, wherein the twisted string actuator terminates on a stop block.

10. The twisted string transmission system of claim 9, wherein the stop block is connected to a non-rotating output cable.

11. The twisted string transmission system of claim 10, wherein the output cable wraps around a pulley.

12. The twisted string transmission system of claim 1, wherein a string of the twisted string actuator extends into a shaft of a motor, wherein the motor causes the rotational motion.

13. The twisted string transmission system of claim 12, wherein a lubrication is applied inside the shaft.

14. The twisted string transmission system of claim 12, wherein the string extends from both the front and the back of the shaft.

15. The twisted string transmission system of claim 1, wherein the twisted string actuator comprises part of a differential drive transmission.

16. The twisted string transmission system of claim 1, further comprising diagnostics for determining diagnostic information describing a state of the twisted string actuator.

17. The twisted string transmission system of claim 16, wherein the diagnostics recalibrate one or more control parameters of the controller on a periodic basis.

18. A method for a twisted string transmission system, comprising:
receiving sensor information regarding a linear force of a twisted string actuator of the twisted string transmission system from a force sensor;
providing control information to control a rotational motion of the twisted string actuator based at least in part on the sensor information, wherein the control information controls the rotational motion that is converted into the linear force using the twisted string actuator; and extending the actuator throw of the twisted string actuator using a block, wherein the block comprises two pulleys and each string of the twisted string actuator is wrapped around a separate pulley and is separately anchored beyond the separate pin such that beyond the pin, strings of the twisted string actuator are untwisted.

19. A computer program product for a twisted string transmission system, the computer program product being embodied in a tangible non-transitory computer readable storage medium and comprising computer instructions for:

receiving sensor information regarding a linear force of a twisted string actuator of the twisted string transmission system from a force sensor;

providing control information to control a rotational motion of the twisted string actuator based at least in part on the sensor information, wherein the control information controls the rotational motion that is converted into the linear force using the twisted string actuator;

determining an output angle of the twisted string actuator from an output angle sensor;

determining a motor angle of the twisted string actuator from a motor angle sensor; and comparing the output angle to the motor angle over time to determine elongation or breakage of a string of the twisted string actuator.

* * * * *